(12) United States Patent
Chao

(10) Patent No.: US 8,504,851 B2
(45) Date of Patent: Aug. 6, 2013

(54) ELECTRONIC DEVICE HAVING POWER CONSUMPTION ADJUSTING FEATURE

(75) Inventor: Kuan-Hsiang Chao, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 288 days.

(21) Appl. No.: 13/031,622

(22) Filed: Feb. 22, 2011

(65) Prior Publication Data

US 2012/0151228 A1 Jun. 14, 2012

(30) Foreign Application Priority Data

Dec. 14, 2010 (TW) .............................. 99143659 A

(51) Int. Cl.
*G06F 1/00* (2006.01)
*G06F 1/26* (2006.01)
*H02J 1/10* (2006.01)
*H02J 3/14* (2006.01)
*H02M 7/5383* (2007.01)
*G01R 21/00* (2006.01)
*G01R 19/00* (2006.01)

(52) U.S. Cl.
USPC ............. 713/300; 713/320; 713/340; 307/18; 307/31; 307/52; 307/80; 363/65; 363/74; 702/60; 702/64

(58) Field of Classification Search
USPC .................... 713/300, 320, 340; 363/65, 74; 307/18, 31, 52, 80; 702/60, 64
See application file for complete search history.

(56) References Cited

U.S. PATENT DOCUMENTS

| | | | | |
|---|---|---|---|---|
| 7,272,732 | B2* | 9/2007 | Farkas et al. .................. | 713/320 |
| 7,555,666 | B2* | 6/2009 | Brundridge et al. .......... | 713/340 |
| 7,624,286 | B2* | 11/2009 | Lin et al. ........................ | 713/300 |
| 8,132,034 | B2* | 3/2012 | Lambert et al. ............... | 713/330 |
| 8,245,069 | B2* | 8/2012 | Farmer et al. ................. | 713/340 |
| 2010/0287394 | A1* | 11/2010 | Branover et al. ............. | 713/323 |
| 2012/0124406 | A1* | 5/2012 | Lu ................................. | 713/340 |

* cited by examiner

*Primary Examiner* — Stefan Stoynov
(74) *Attorney, Agent, or Firm* — Altis Law Group, Inc.

(57) ABSTRACT

An electronic device includes a central processing unit (CPU), a number of power supply units (PSUs), a north bridge, a south bridge, and a baseboard management controller (BMC). The number of power supply units (PSUs) supplies power to the CPU. Each PSU has a rated power. The north bridge is connected to the CPU. The south bridge is connected to the north bridge. The BMC is connected to the CPU by the north and south bridges. The BMC detects power supply states of each PSU and controls the north bridge to adjust a power consumption of the CPU according to the power supply states of the PSUs.

15 Claims, 2 Drawing Sheets

ELECTRONIC DEVICE HAVING POWER CONSUMPTION ADJUSTING FEATURE

BACKGROUND

1. Technical Field

The disclosure generally relates to electronic devices, and particularly to an electronic device having power consumption adjusting feature such as a server, or a switch in a network.

2. Description of Related Art

To obtain a stable and reliable communication, multiple power supply units (PSUs) are used to provide power to an electronic device such as a server, or a switch in a network. Therefore, when some of PSU(s) cannot work normally, the remaining PSU(s) can provide power to the electronic device to maintain the communication of the network.

However, the remaining PSU(s) cannot satisfy the power consumption of the electronic device for a long time in this case, the electronic device may be damaged or abnormally power off.

Therefore, there is room for improvement within the art.

BRIEF DESCRIPTION OF THE DRAWINGS

Many aspects of the electronic device having power consumption adjusting feature can be better understood with reference to the following drawings. The components in the drawings are not necessarily drawn to scale, the emphasis instead being placed upon clearly illustrating the principles of the electronic device having power consumption adjusting feature.

DETAILED DESCRIPTION

Figure 1:
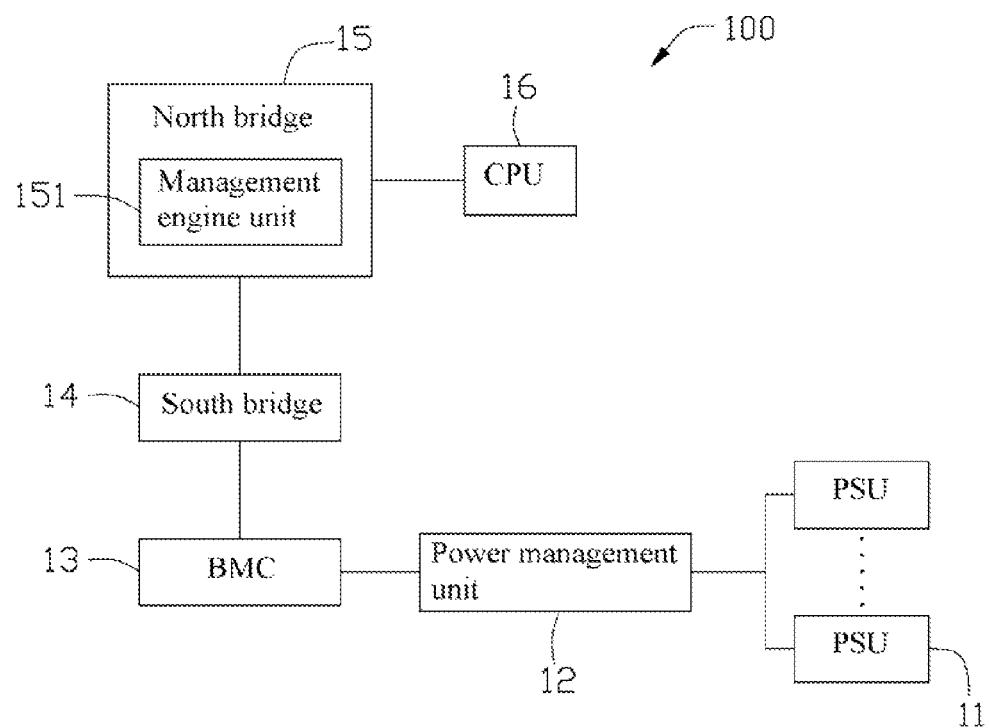
FIG. 1 is a block diagram of an electronic device having power consumption adjusting feature, according to an exemplary embodiment.

FIG. 1 shows an electronic device 100 having power consumption adjusting feature, according to an exemplary embodiment. The electronic device 100 includes a plurality of power supply units (PSUs) 11, a power management unit 12, a baseboard management controller (BMC) 13, a south bridge 14, a north bridge 15, and a CPU 16. The PSUs 11 are all connected to the power management unit 12. The power management unit 12, the BMC 13, the south bridge 14, the north bridge 15 and the CPU 16 are connected in series.

The PSUs 11 supply power to the CPU 16. Each PSU 11 includes a rated power which can be provided to the electronic device 100.

The power management unit 12 is configured for realizing communication between the BMC 13 and the PSUs 11 and regulating voltages output from the PSUs 11. For example, when a voltage output from the PSUs 11 is 3V, the power management unit 12 can regulates the voltage to be 5V which is suitable for the CPU 16.

The BMC 13 detects power supply states of the PSUs 11 by the power management unit 12. When one or more of the PSUs 11 cannot supply power to the CPU 16 normally, the BMC 13 controls the north bridge 15 to adjust the power consumption of the CPU 16 according to the detected power supply states of the PSUs 11 (i.e. whether the PSUs 11 can supply power to the CPU 16 normally or not).

The north bridge 15 includes a management engine unit 151. The management engine unit 15 may be software installed in the north bridge 15. The management engine unit 151 can adjust the power consumption of the CPU 16 under the control of the BMC 13.

The CPU 16 includes a plurality of performance parameters, such as working frequencies. The power consumption of the CPU 16 can be adjusted by changing the performance parameters according to the power supply states of the PSUs 11.

When the PSUs 11 normally supply power to the CPU 16, the CPU 16 works at a maximum working frequency, which corresponds to a maximum power consumption of the CPU 16. The maximum power consumption may be a sum of the rated power of the PSUs 11.

When one or more PSU 11 works abnormally, the CPU 16 initially works at a preset working frequency, which corresponds to a minimum power consumption of the CPU 16. The minimum power consumption may be lower than the rated power of one PSU 11. Then, the working frequency of the CPU 16 is gradually increased until the power consumption of the CPU 16 reaches to a sum of the rated power of the remaining PSUs 11.

As illustrated, it is assumed that the electronic device 100 includes two PSUs 11, and each PSU 11 has a rated power of 1000 W. When the two PSUs 11 supply power to the CPU 16 normally, the CPU 16 works at a maximum working frequency corresponding to a maximum power consumption of the CPU 16. The maximum power consumption may be 2000 W. When one of the PSUs 16 cannot supply power to the CPU 16 normally, the CPU 16 initially works at a preset lower working frequency corresponding to a minimum power consumption such as 200 W. Then, the working frequency of the CPU 16 is increased until the power consumption of the CPU 16 reach to a power consumption, which can be provided by the remaining PSU 11, which is 1000 W. Therefore, the CPU 16 can normally work by the support of the remaining PSU 11 and also efficiently use the power supplies by the remaining PSU(s) 11.

Figure 2:
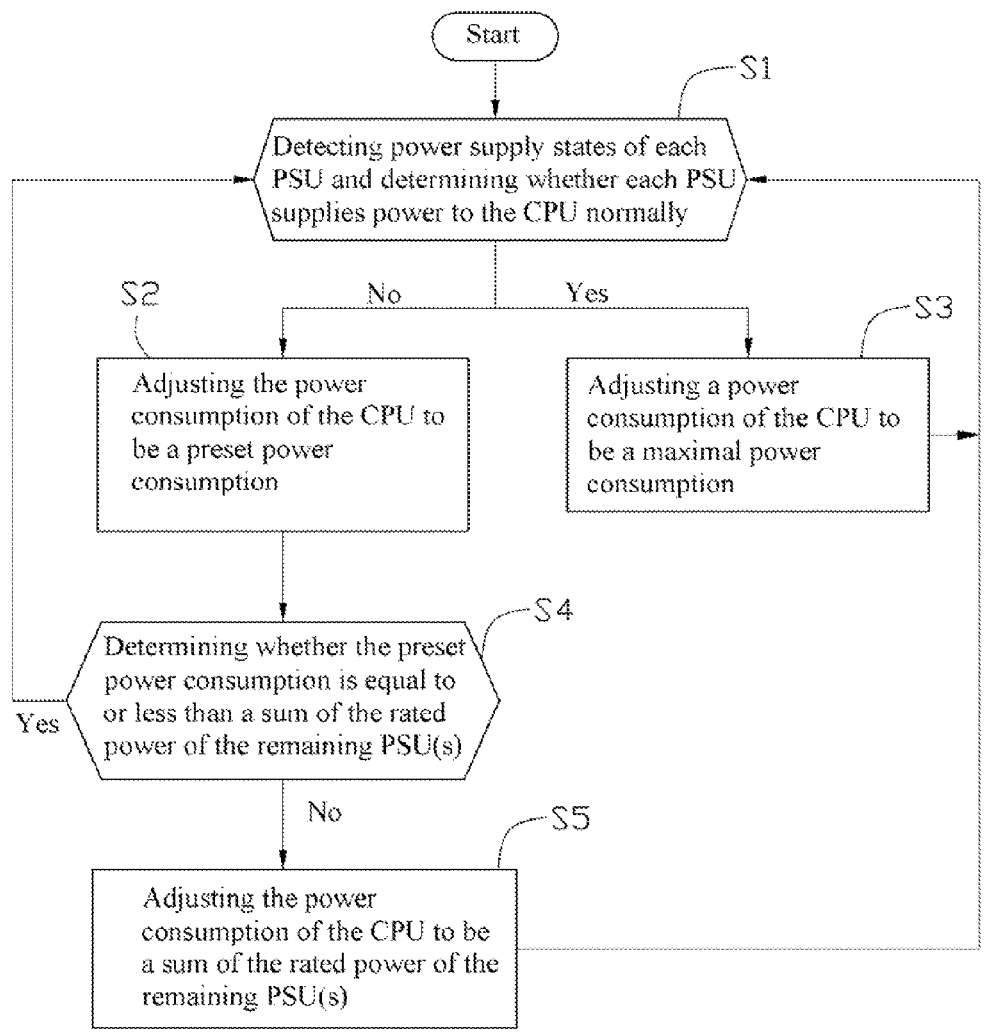
FIG. 2 is a flowchart of a power consumption adjusting process of the electronic device of FIG. 1.

Referring to FIG. 2, a power consumption adjusting process of the electronic device 100 may include following steps:

In step S1, the BMC 13 detects power supply states of each PSU 11 and determines whether each PSU 11 supplies power to the CPU 16 normally. If one or more of the PSU(s) 11 cannot supply power to the CPU 16 normally, the process goes to step S2. If each PSU 11 supplies power normally, the process goes to step S3.

In step S2, the BMC 13 sends a first control signal to the management engine unit 151 of the north bridge 15. The management engine unit 151 adjusts a power consumption of the CPU 16 to be a preset power consumption by adjusting the performance parameter of the CPU 16, then the process goes to step 4.

In step S3, the BMC 13 sends a second control signal to the management engine unit 151 of the north bridge 15. The management engine unit 151 adjusts the power consumption of the CPU 16 to be a maximum power consumption, which may be equal to a sum of the rated power of each PSU 11, the process turns to step S1, and the BMC 13 continues to detect the power supply states of each PSU 11.

In step S4, the BMC 13 determines whether, the preset power consumption of the CPU 16 is equal to or less than a sum of the rated power of the remaining PSUs 11. If the preset power consumption is equal to the sum of the rated power of the remaining PSUs 11, the process turns to step S1. If the preset power consumption is less than the sum of the rated power of the remaining PSUs 11, the process goes to step S5.

In step S5, the BMC 13 sends a third control signal to the management engine unit 151 of the north bridge 15. The management engine unit 151 increases the power consumption of the CPU 16 until the power consumption of the CPU 16 reach to a sum of the rated powers of the remaining PSUs 11. Then, the process turns to step S1.

The electronic device 100 can dynamically adjust the power consumption of the CPU 16 according to the power supply states of each PSU 11. When some PSU(s) 11 cannot supply power to the CPU 16, the remaining PSU(s) 11 can satisfy the power computation of the CPU 16.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device, comprising:
    a central processing unit (C Pt);
    a plurality of power supply units (PSUs) supplying power to the CPU, each PSU having a rated power;
    a north bridge connected to the CPU;
    a south bridge connected to the north bridge; and
    a baseboard management controller (BMC) connected to the north bridge through the south bridge, the BMC detecting power supply states of each PSU and controlling the north bridge to adjust a power consumption of the CPU according to the power supply states of the PSUs.

2. The electronic device as claimed in claim 1, wherein when one or more PSU(s) cannot supply power normally. the BMC controls the north bridge to adjust the power consumption to he a preset power consumption.

3. The electronic device as claimed in claim 2, wherein the BMC determines whether the preset power consumption is equal to or less than a sum of the rated power of remaining PSU(s) and controls the north bridge to adjust the power consumption of the CPU according to the. determination.

4. The electronic device as claimed in clam 1, wherein when the preset power consumption is less than the sum of the rated power of remaining PSU(s), the BMC controls the north bridge to increase the power consumption of the CPU.

5. The electronic device as claimed in claim 1, wherein when each PSU supplies power to the CPU normally, the BMC controls the north bridge to adjust the power consumption to he a maximum power consumption which equals to the sum of the rated power of the PSUs.

6. The electronic device as claimed in claim 1., wherein the north bridge includes a management engine unit, the management engine unit adjusts the power consumption of the CPU by changing performance parameters of the CPU.

7. The electronic device as claimed in claim 6. wherein the performance parameters includes a working, frequency of the CPU.

8. The electronic device as claimed in claim 6, further includes a power management unit set between the BMC and. the plurality of PSUs and realizing communication between the BMC and the plurality of PSUs.

9. A method for adjusting a power consumption of an electronic device, the electronic device including a CPU and a plurality of power supply units (PSUs) supplying power to the CPU; comprising:
    detecting, power supply states of each PSU;
    adjusting the power consumption of the CPU according to the power supply states of the PSUs.

10. The method as claimed in claim 9, wherein adjusting the power consumption to be a preset power consumption when one or more PSU(s) cannot supply power normally.

11. The method as claimed in claim 10, Wherein determining whether the preset power consumption is equal to or less than a sum of a rated power of remaining PSU(s); adjusting the power consumption of the CPU according to the determination.

12. The method as claimed in claim 9, wherein increasing the power consumption of the CPU to he the sum of the rated power of remaining PSU(s) when the preset power consumption is less than the sum of the rated power of remaining PSU(s).

13. The method as claimed in claim 9, wherein adjusting the power consumption of the CPU to be a maximum power consumption when each PSU supplies power to the CPU normally.

14. The method as claimed in claim 9, wherein the power consumption of the CPU is adjusted by changing performance parameters of the CPU.

15. The method as claimed in claim 14. wherein the performance parameters includes a working frequency of the CPU.

* * * * *